(12) United States Patent
Chang et al.

(10) Patent No.: US 6,682,862 B1
(45) Date of Patent: Jan. 27, 2004

(54) METHOD OF FABRICATING COLOR FILTER SUBSTRATE FOR LIQUID CRYSTAL DISPLAY DEVICE

(75) Inventors: Youn-Gyoung Chang, Gyeonggi-do (KR); Jung-Jae Lee, Gyeonggi-do (KR); Sam-Yeoul Kim, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/419,255

(22) Filed: Apr. 21, 2003

(30) Foreign Application Priority Data

Dec. 24, 2002 (KR) .......................... 2002-83198

(51) Int. Cl.$^7$ .......................... G02F 1/1335; G02B 5/20
(52) U.S. Cl. .......................... 430/7; 430/200
(58) Field of Search .......................... 430/7, 200, 201

(56) References Cited

U.S. PATENT DOCUMENTS

| | | |
|---|---|---|
| 5,994,028 A | 11/1999 | Lee |
| 6,146,792 A * | 11/2000 | Blanchet-Fincher et al. ... 430/7 |
| 6,242,140 B1 | 6/2001 | Kwon et al. |

* cited by examiner

*Primary Examiner*—John A. McPherson
(74) *Attorney, Agent, or Firm*—Morgan Lewis & Bockius LLP

(57) ABSTRACT

A method of fabricating a color filter substrate for a liquid crystal display device includes the steps of forming a black matrix on a substrate; adhering a color transcription film to the substrate; disposing a laser head over the color transcription film; repeatedly scanning the color transcription film; and removing the color transcription film so that a color filter pattern remains in color filter pattern regions defined inside the black matrix. End lines for each one of the repeated scans are located on the black matrix.

24 Claims, 16 Drawing Sheets

METHOD OF FABRICATING COLOR FILTER SUBSTRATE FOR LIQUID CRYSTAL DISPLAY DEVICE

The present invention claims the benefit of Korean Patent Application No. P2002-083198 filed in Korea on Dec. 24, 2002, which is hereby incorporated by reference.

BACKGROUND OF THE INVENTION

1. Field of the Invention

The present invention relates to a liquid crystal display device, and more particularly, to a method of fabricating a color filter substrate for a liquid crystal display device.

2. Discussion of the Related Art

Due to rapid development in information technology, display devices have evolved to process and display increasingly large amounts of information. Flat panel display technologies have been recently conceived and developed for display devices having small thickness, light weight, and low power consumption. Among these technologies, the liquid crystal display (LCD) device is already widely used for notebook computers, desktop monitors, and other applications because of its superior resolution, color image display, and image quality.

In general, an LCD device includes an upper substrate, a lower substrate, and a liquid crystal layer disposed between the upper and lower substrates. The LCD device uses an optical anisotropy of a liquid crystal material and produces an image by varying the transmittance of light according to the arrangement of liquid crystal molecules by an electric field.

The lower substrate, which is usually referred to as an array substrate, includes thin film transistors and pixel electrodes. The lower substrate is fabricated through repeated photolithography processes to pattern a previously formed thin film. The upper substrate, which is usually referred to as a color filter substrate, includes a color filter layer for displaying color images. The color filter layer commonly includes sub-color filters of red (R), green (G), and blue (B). The color filter layer is formed by various methods including, for example, a dyeing method, an electro-deposition method, a pigment dispersion method, and a printing method. In general, the pigment dispersion method is more commonly used because it forms a fine pattern with good reproducibility.

FIGS. 1A to 1D are cross-sectional views showing a method of fabricating a color filter substrate for a liquid crystal display (LCD) device according to the related art. Here, the pigment dispersion method is used.

In FIG. 1A, a black matrix 15 is formed on an insulating substrate 10 by depositing a metal material or coating a resin and patterning the metal material or the resin through a photolithography process. The black matrix 15 blocks light leakage, which is caused by irregular operation of liquid crystal molecules, in regions except pixel electrodes of an array substrate (not shown). The black matrix 15 also prevents light from going into a channel of a thin film transistor of the array substrate.

As shown in FIG. 1B, a color resist 17, which may be one of red, green and blue resists, for example a red one, is coated on the substrate 10 including the black matrix thereon by spin coating. A mask 20 having a light transmitting portion and a light blocking portion is disposed over the red resist 17, and the red resist 17 is exposed to light using the mask 20. Here, the red resist 17 is shown to have a negative property. That is, a portion of the red resist 17 that is not exposed to light is removed.

As shown in FIG. 1C, the red resist 17 of FIG. 1B is developed, and a red color filter pattern 17a is formed. Then, the red color filter pattern 17a is cured and hardened.

As shown in FIG. 1D, green and blue color filter patterns 17b and 17c are formed on the black matrix 15 through similar processes as shown in FIGS. 1B and 1C. Next, an overcoat layer 23 and a common electrode 25 are subsequently formed on the substrate 10 including the color filter patterns 17a, 17b and 17c. The overcoat layer 23 protects the color filter patterns 17a, 17b and 17c, and flattens the surface of the substrate 10 having the color filter patterns 17a, 17b and 17c. The common electrode 25 is made of a transparent conductive material, such as indium-tin-oxide and indium-zinc-oxide. The overcoat layer 23 may be omitted.

In the fabrication method of the color filter substrate using the pigment dispersion, since the color filter substrate is fabricated by repeated processes of coating, exposing, developing, and curing of a color resist, the fabrication method is complicated, thereby requiring much time and equipment. To solve the above problem, a fabrication method of a color filter substrate using thermal imaging has been proposed, as disclosed for example in U.S. Pat. No. 6,242,140.

FIGS. 2A to 2D show a method of fabricating a color filter substrate using thermal imaging according to the related art.

As shown in FIG. 2A, a black matrix 35 is formed on an insulating substrate 30 by depositing a metal material or coating a resin, and patterning the metal material or the resin by photolithography.

Then, as shown in FIG. 2B, a first color transcription film 40 is disposed over the substrate 30 including the black matrix 35. The first color transcription film 40 includes a supporting film 40a, a light-to-heat conversion (LTHC) layer 40b, and a color filter layer 40c.

Next, as shown in FIG. 2C, the first color transcription film 40 is adhered to the substrate 30 without bubbles. A laser head 50, from which a laser beam is generated, is disposed over the first color transcription film 40. The laser beam is applied to the first color transcription film 40 in a portion where a first color filter pattern will be formed later while the laser head 50 is reciprocated in a straight line. In the first color transcription film 40 exposed to the laser beam, the LTHC layer 40b transforms light absorbed from the laser beam into thermal energy, thereby emitting thermal energy. Then, the color filter layer 40c is transferred on the substrate 30 due to the emitted thermal energy. Here, the color filter substrate may be a stripe type where color filter patterns in a line have the same color. In that case, a first line is exposed to the laser beam by moving the laser head in a straight line, but second and third lines are skipped. Similarly, a fourth line is exposed to the laser beam. In this manner, all the lines of the first color filter pattern are exposed by the above method, and the first color transcription film 40 is removed.

As shown in FIG. 2D, the first color filter pattern 45a is formed between the adjacent black matrixes 35 on the substrate 30. The first color filter pattern 45a may be a red color filter. A second color filter pattern 45b and a third color filter pattern 45c are formed through the same process shown in FIGS. 2B and 2C. The second and third color filer patterns 45b and 45c may be green and blue color filters, respectively. The substrate 30 having the color filter patterns 45a, 45b and 45c is placed in a hardening furnace, and the color filter patterns 45a, 45b and 45c are hardened. An overcoat layer 47 is formed on the color filter patterns 45a, 45b and 45c. The overcoat layer 47 protects the color filter patterns 45a, 45b and 45c and flattens the surface of the substrate 30 otherwise having steps. A common electrode 49 is formed on the overcoat layer 47 by depositing a transparent conductive material, such as indium-tin-oxide and/or indium-zinc-oxide.

In the thermal imaging method, manufacturing throughput of the color filter substrate is influenced by an application direction of the laser beam, wherein the laser beam is applied to the transcription film in a direction parallel to a pixel length of the LCD device. For example, in a color filter substrate of a video graphic array (VGA) LCD device, which has a resolution of 640 by 480, the VGA LCD device has sub-pixels of 640 by 3 lines (i.e., 1920 lines). Thus, the laser head 50 must scan 640 times for each color filter pattern. Therefore, total number of scans is 1920. Additionally, a size of the pixel depends on the resolution being used (e.g., VGA, SVGA (super video graphic array), XGA (extended graphic array), and so on), thereby causing difficulty to have a laser beam fit for each pixel size.

The scanning of the laser head 50 may be accomplished in a direction parallel to a pixel width of the LCD device, thereby reducing the scanning times. This may be referred to as a horizontal laser scan. The manufacturing throughput of the color filter substrate is improved due to reduction of the scanning times. However, in this case, there is a problem that scanning traces may be formed at pixel regions, thereby reducing image quality.

FIGS. 3A and 3B show a color filter substrate fabricated by a thermal imaging method using the horizontal laser scan according to the related art. FIG. 3B is an enlarged view of region A in FIG. 3A.

In FIGS. 3A and 3B, a substrate 30 includes a black matrix 35 and a color filter pattern 45 thereon. The black matrix 35 has an opening in which the color filter pattern 45 is placed. The color filter pattern 45 is formed by the thermal imaging method using a horizontal laser scan. A laser head 50 having a plurality of laser pixels 52 first scans the substrate 30 in a direction parallel to a length of a pixel P turning the laser pixel 52 repeatedly on and off. After the first scan, the laser head 50 is moved in the vertical direction of the substrate 30 in the context of the Figure by a width of the first scan, and a second scan is accomplished. Here, a scanning trace 55 is formed in a border between first and second scanning regions. The scanning trace 55 is situated on the color filter pattern 45. The scanning trace 55 on the color filter pattern 45 lowers image qualities.

SUMMARY OF THE INVENTION

Accordingly, the present invention is directed to a method of fabricating a color filter substrate for a liquid crystal display device that substantially obviates one or more of problems due to limitations and disadvantages of the related art.

An object of the present invention is to provide a method of fabricating a color filter substrate for a liquid crystal display device that reduces a total number of manufacturing processes and reduces manufacturing costs.

Another object of the present invention is to provide a method of fabricating a color filter substrate for a liquid crystal display device that improves image qualities.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a color filter substrate for a liquid crystal display device comprises steps of forming a black matrix on a substrate; adhering a color transcription film to the substrate; disposing a laser head over the color transcription film; repeatedly scanning the color transcription film so that end lines defined by each one of the repeated scans are located on the black matrix; and removing the color transcription film so that a color filter pattern remains in color filter pattern regions defined inside the black matrix.

In another aspect, a method of fabricating a color filter substrate for a liquid crystal display device, comprises steps of forming a black matrix on a substrate, the black matrix defining a plurality of openings as color filter pattern regions; adhering a color transcription film to the substrate having the black matrix formed thereon; disposing a laser head over the color transcription film, the laser head including a plurality of laser pixels; repeatedly scanning the color transcription film by controlling ON/OFF states of the laser pixels to define an exposure pattern, wherein end lines of each one of the repeated scans is located on the black matrix; and removing the color transcription film so that a color filter pattern remains in desired ones of the color filter pattern regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4A:
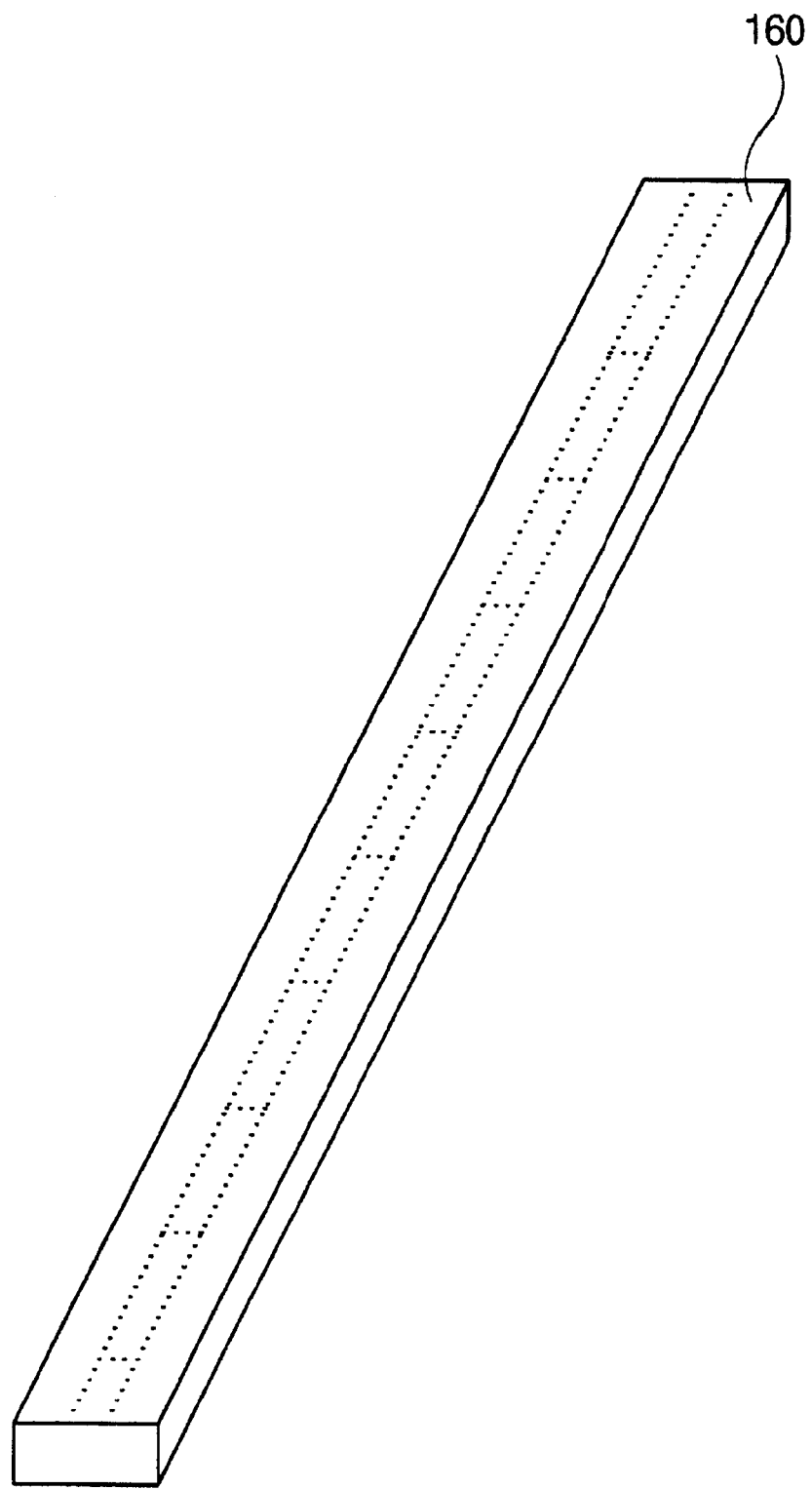
FIGS. 4A and 4B are views of a laser head used in accordance with the present invention.
Figure 4B:
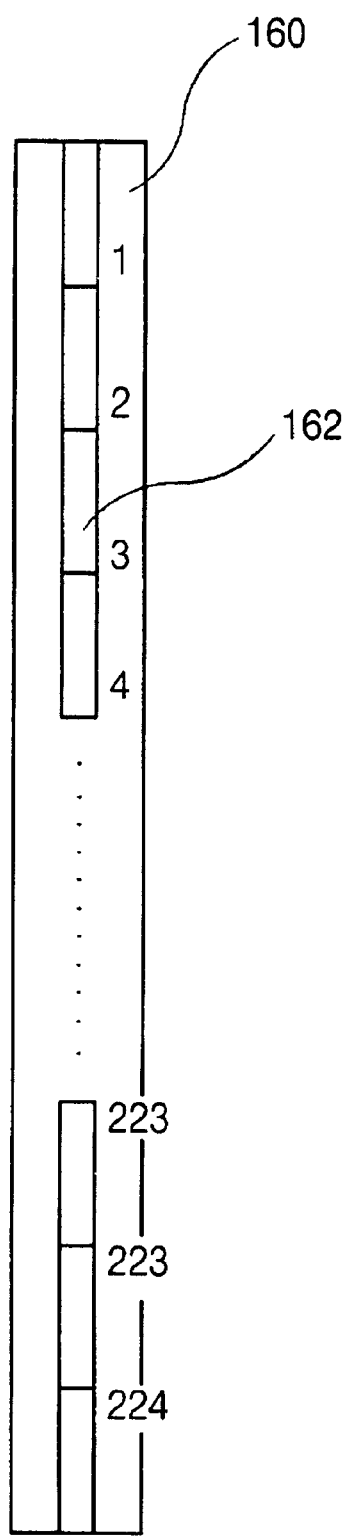
Figure 5:
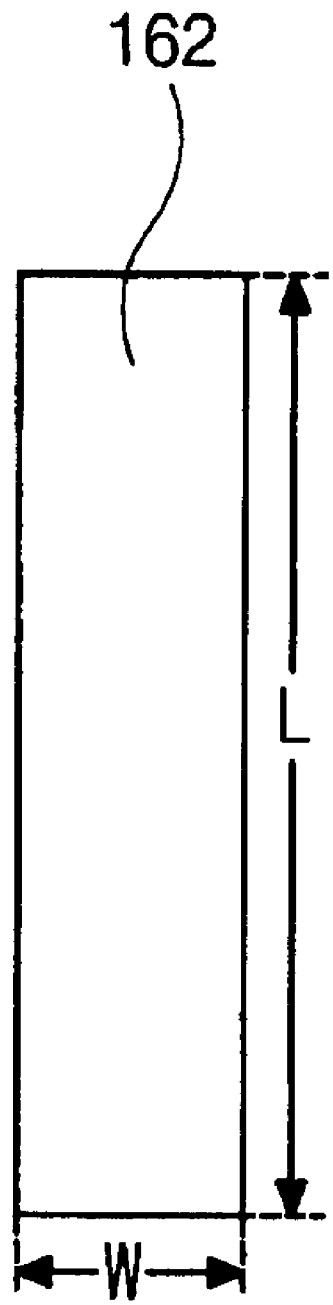
FIG. 5 is a view showing a laser pixel of the laser head in FIGS. 4A and 4B.

FIGS. 4A and 4B show a laser head used in the present invention. FIG. 4A is a perspective view of the laser head used in the present invention, and FIG. 4B is a view showing a base side of the laser head. FIG. 5 shows a laser pixel of the laser head.

In FIGS. 4A, 4B, and 5, the laser head 160 has 224 laser pixels 162 arranged in a line. The laser pixel 162 may have a length L of about 5 μm to about 20 μm and a width W of about 3 μm. Of course, the laser pixel 162 may have a different size, such as a larger size, than that described above. In this example, the entire size of the laser pixels 162 in the laser head 160 is about 4480 μm by 3 μm, and the scan width of the laser head 160 is about 4480 μm. The laser pixel 162 of the laser head 160 is automatically operated by a computer system such that the laser pixel 162 turns on and off according to color filter patterns of red, green and blue.

Figure 6:
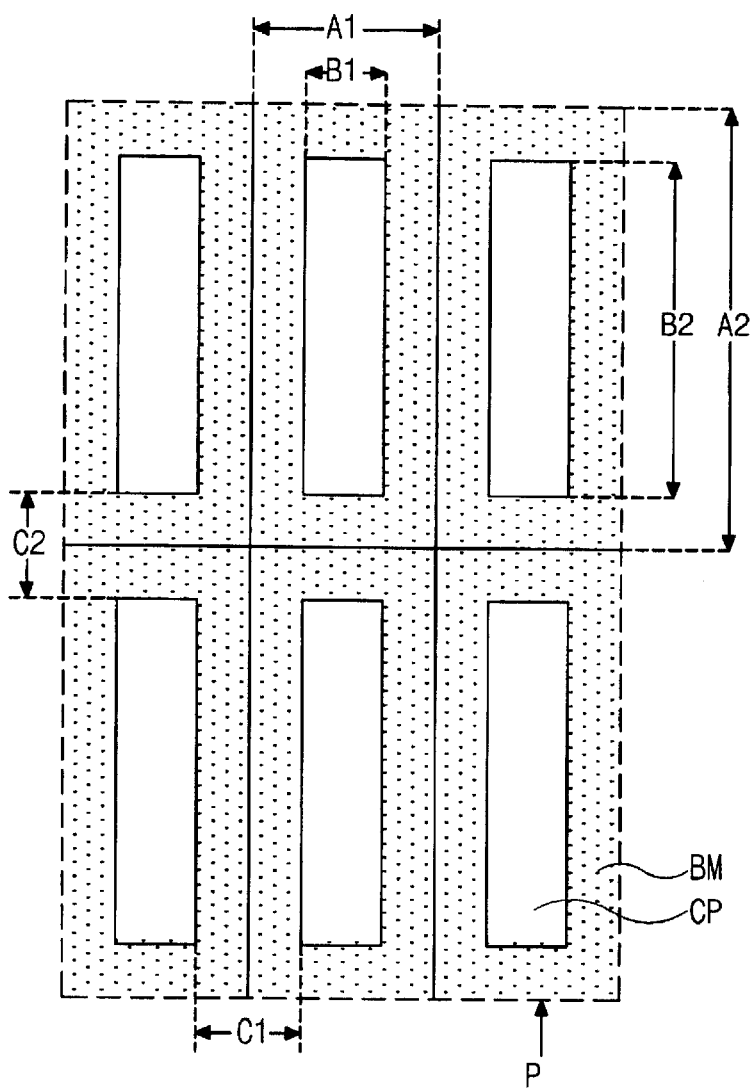
FIG. 6 is a plan view of a color filter substrate according to the present invention.

FIG. 6 is a plan view of a color filter substrate according to the present invention. In FIG. 6, A1 indicates a width of a pixel P, A2 designates a length of the pixel P, B1 expresses a width of a color filter pattern CP, and B2 represents a length of the color filter pattern CP. A first distance between the color filter patterns CP horizontally adjacent in the context of the Figure (that is, a horizontal width of a black matrix BM) is represented by C1. A second distance between the color filter patterns CP vertically adjacent in the context of the Figure (that is, a vertical width of the black matrix BM) is marked by C2. The size of the pixel P depends on the resolution and the display size of the LCD device. Here, the pixel width A1 is generally within a range of about 70 μm to about 100 μm, the pixel length A2 is generally within a range of about 200 μm to about 350 μm, and the first and second distances C1 and C2 are generally within a range of about 5 μm to about 40 μm.

For example, in a XGA LCD device of 14.1 inch, the pixel P has a width A1 of about 93 μm and a length A2 of about 280 μm. The vertical width C2 of the black matrix BM is about 24 μm. Thus, the length B2 and width B1 of the color filter pattern CP are about 256 μm and 69 μm, respectively.

Figure 7:
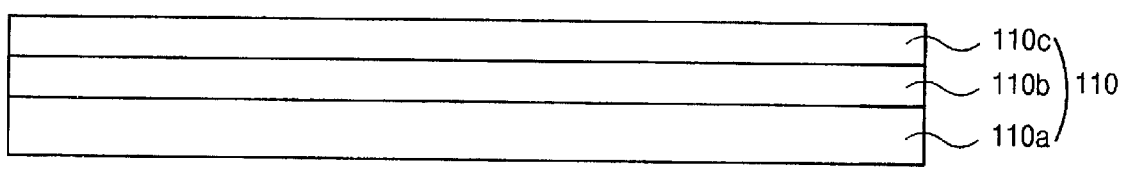
FIG. 7 is a cross-sectional schematic view showing a color transcription film.

FIG. 7 schematically shows a color transcription film. As shown in FIG. 7, the color transcription film 110 includes three layers: a supporting film 110a; a light-to-heat conversion (LTHC) layer 110b; and a color filter layer 110c. The lowest supporting film 110a, which supports the LTHC layer 110b and the color filter layer 110c, includes a high molecular substance, such as polyester and polyethylene, having transparent and high transmittance characteristics in order to transmit the laser beam to the LTHC layer 110b therethrough. The LTHC layer 110b is formed on the supporting film 110a of a material that can efficiently convert light into heat. Accordingly, the LTHC layer 110b converts light energy from the laser head 160 into heat energy. The LTHC layer 110b may include an organic material, such as carbon black and IR (infrared) pigments, or an inorganic material such as a metal material (e.g., aluminum (Al), a metallic oxide, or an alloy of the above materials). The color filter layer 110c, which is the layer to be transferred, is formed on the LTHC layer 110b and includes one of red, green and blue colors.

FIGS. 8A to 8D show a method of fabricating a color filter substrate according to the present invention.

Figure 8A:
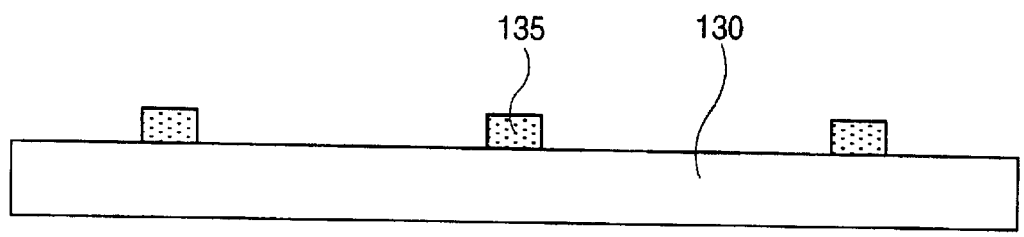
FIGS. 8A to 8D are cross-sectional views showing a method of fabricating a color filter substrate in accordance with the present invention.

As shown in FIG. 8A, a black matrix 135 is formed on an insulating substrate 130 by depositing a metal material, such as chromium (Cr), or coating a resin, such as an epoxy. Then, the metal material or resin is patterned through photolithography.

Figure 8B:
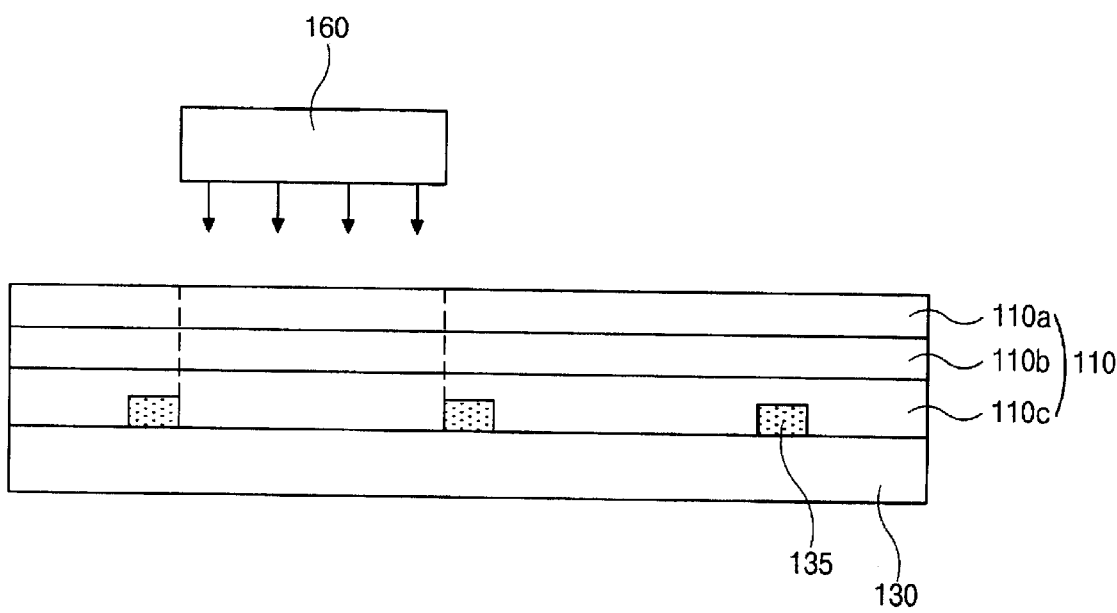

Next, as shown in FIG. 8B, a first color transcription film 110—which includes a supporting film 110a, a light-to-heat conversion (LTHC) layer 110b, and a color filter layer 110c—is disposed over the substrate 130 including the black matrix 135 with the color filter layer 110c facing the substrate 130. The first color transcription film 110 is adhered to the substrate 130 without bubbles, and a laser head 160 is disposed at a distance over the first color transcription film 110. A laser beam of the laser head 160 is applied to the first color transcription film 110 as the laser head 160 scans the substrate 130.

Figure 8C:
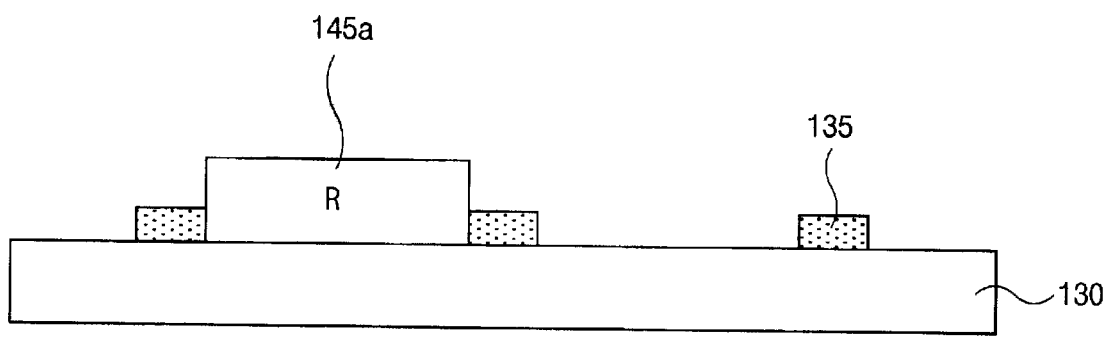

As shown in FIG. 8C, the first color transcription film 110 is removed after the whole substrate 130 is scanned. Accordingly, a first color filter pattern 145a is formed between the adjacent black matrixes 135 on the substrate 130. In the example shown, the first color filter pattern 145a may be a red color filter.

The scanning of the laser head 160 in a thermal imaging method according to the present invention will be described hereinafter with reference to FIGS. 9A and 9B, and FIGS. 10A and 10B. FIGS. 9B and 10B show a color filter substrate fabricated by the thermal imaging method according to the first embodiment of the present invention while FIGS. 9A and 10A are provided for comparison.

Here, the scanning of the laser head 160 is accomplished with the laser head 160 parallel to a pixel width direction. In this example, a pixel has a length within a range of about 200 μm to 350 μm. The laser head 160 includes a plurality of laser pixels (not shown), and the laser head 160 has a length of about 4480 μm. The laser head length, which is a scanning width, corresponds to 14 to 20 pixels arranged in a vertical line in the context of the Figures. In the illustrated example, the scanning width corresponds to almost 15 pixels. A first scanning is accomplished in a horizontal direction in the context of the Figures, and a second scanning is carried out after the laser head 160 moves in a vertical direction by the scanning width. A border between the first and second scanning may be formed on the black matrix BM or on a color filter pattern to be formed later depending on the pixel length, which is determined from the resolution of a LCD device.

In a first exemplary embodiment, the pixel has a size of about 100 μm by about 300 μm, and the black matrix has the vertical width of about 26 μm for a 15.1 inch XGA LCD device.

Figure 1A:
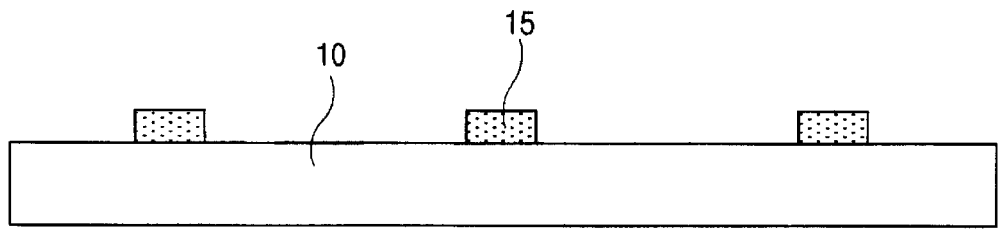
FIGS. 1A to 1D are cross-sectional views showing a method of fabricating a color filter substrate for a liquid crystal display (LCD) device according to the related art.
Figure 1B:
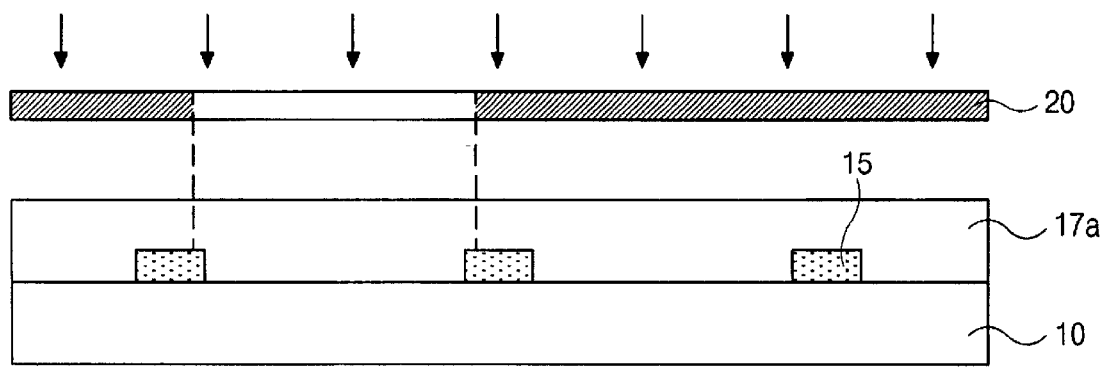
Figure 1C:
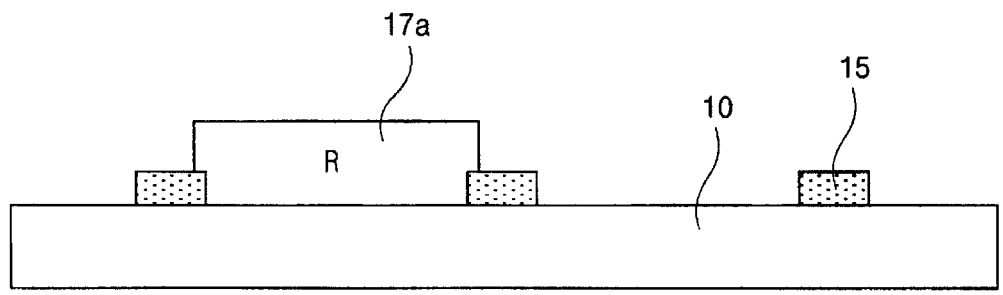
Figure 1D:
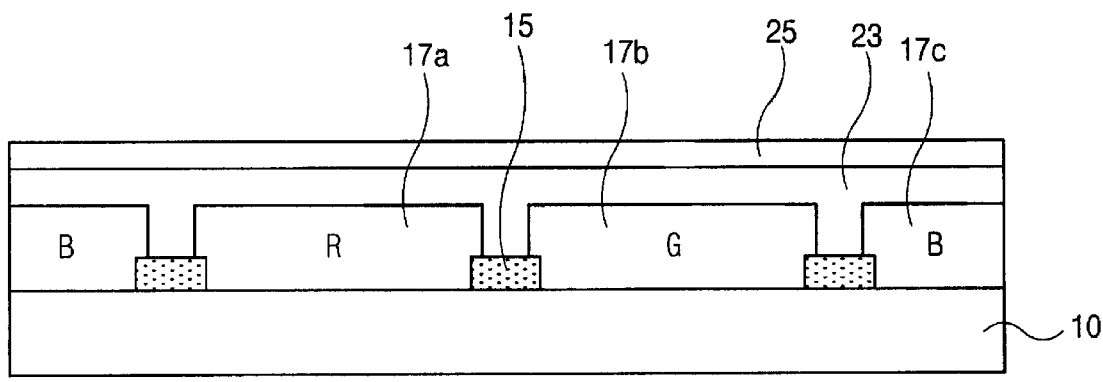
Figure 2A:
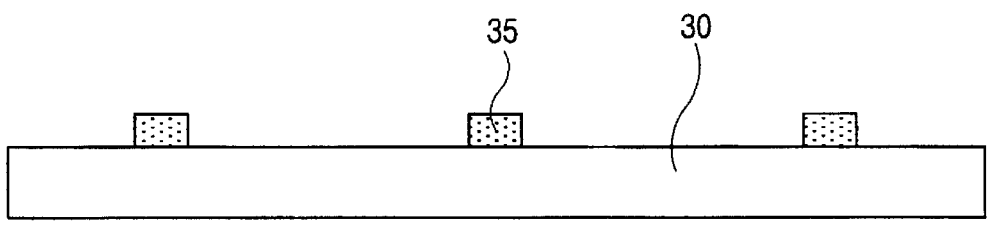
FIGS. 2A to 2D are cross-sectional views showing a method of fabricating a color filter substrate using thermal imaging according to the related art.
Figure 2B:
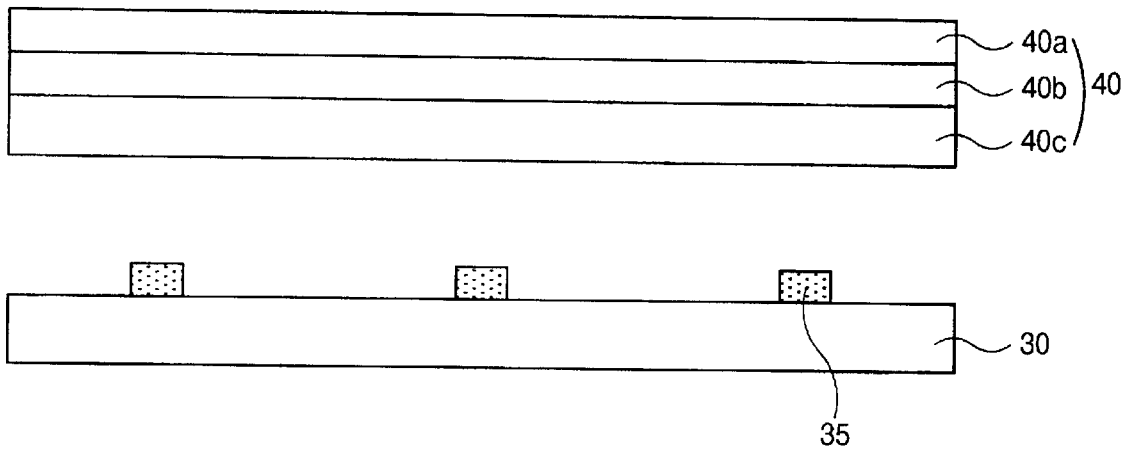
Figure 2C:
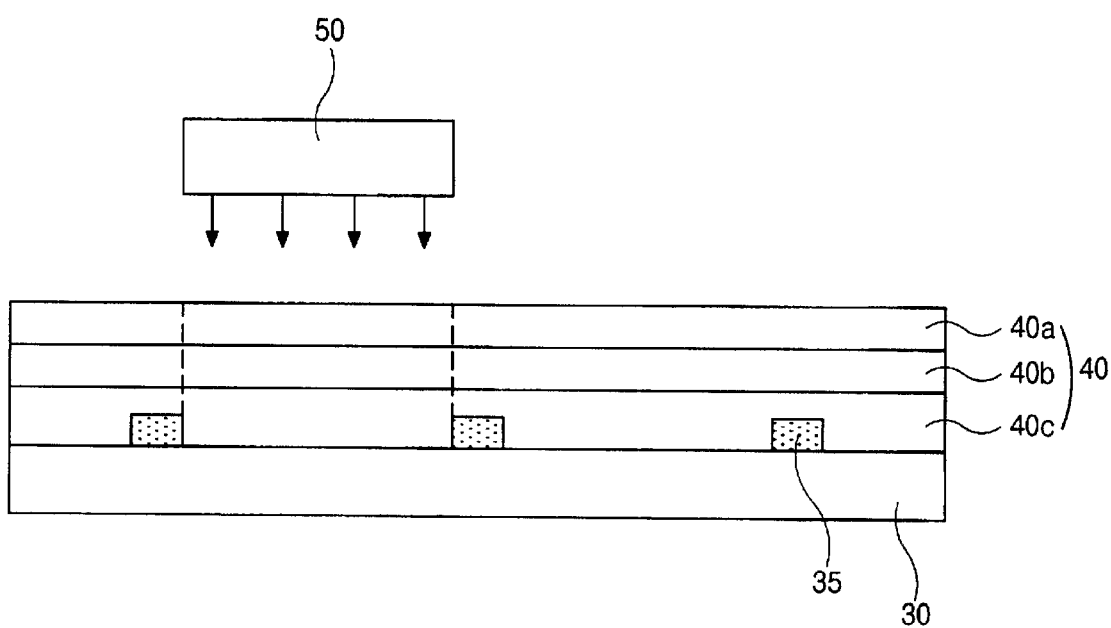
Figure 2D:
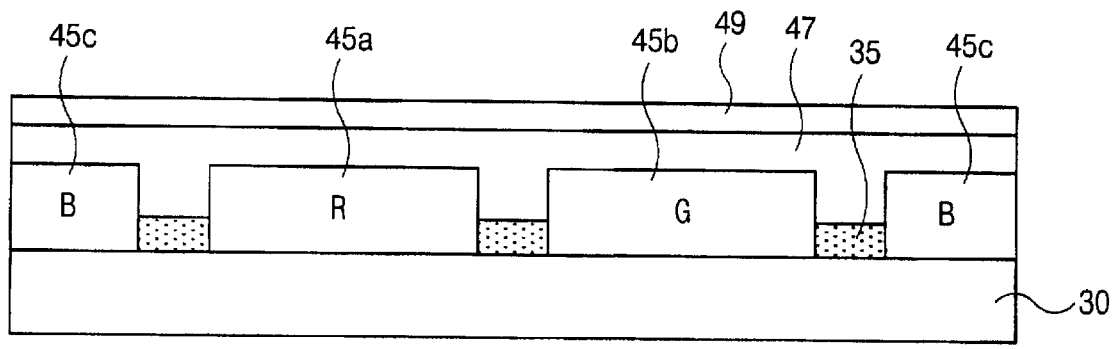
Figure 3A:
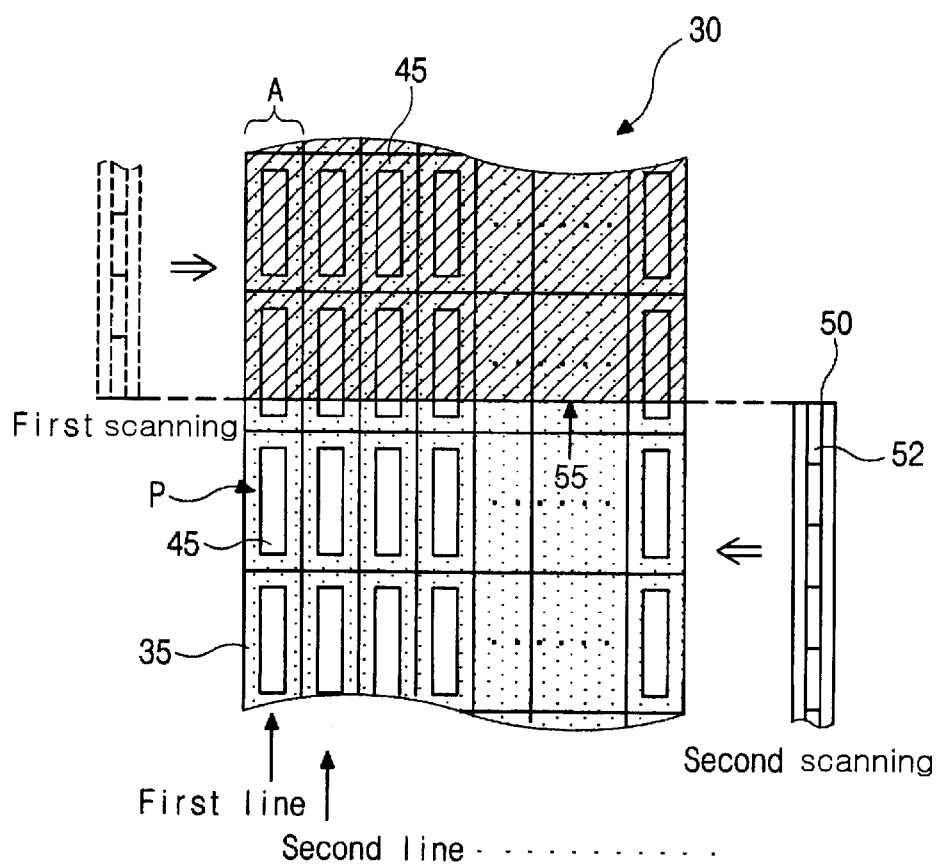
FIGS. 3A and 3B are plan views showing a color filter substrate fabricated by a thermal imaging method using the horizontal laser scan according to the related art.
Figure 3B:
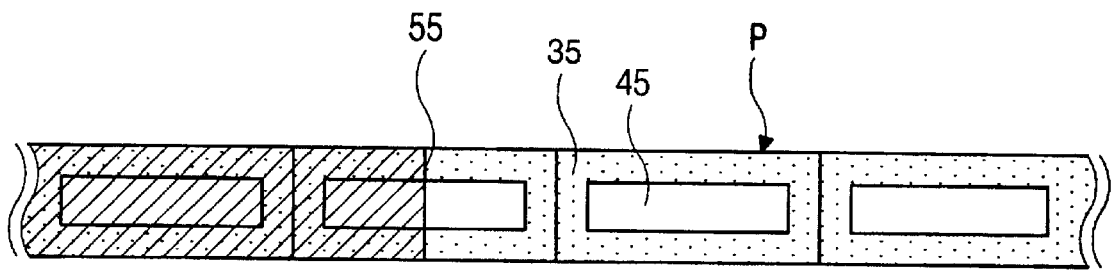
Figure 9A:
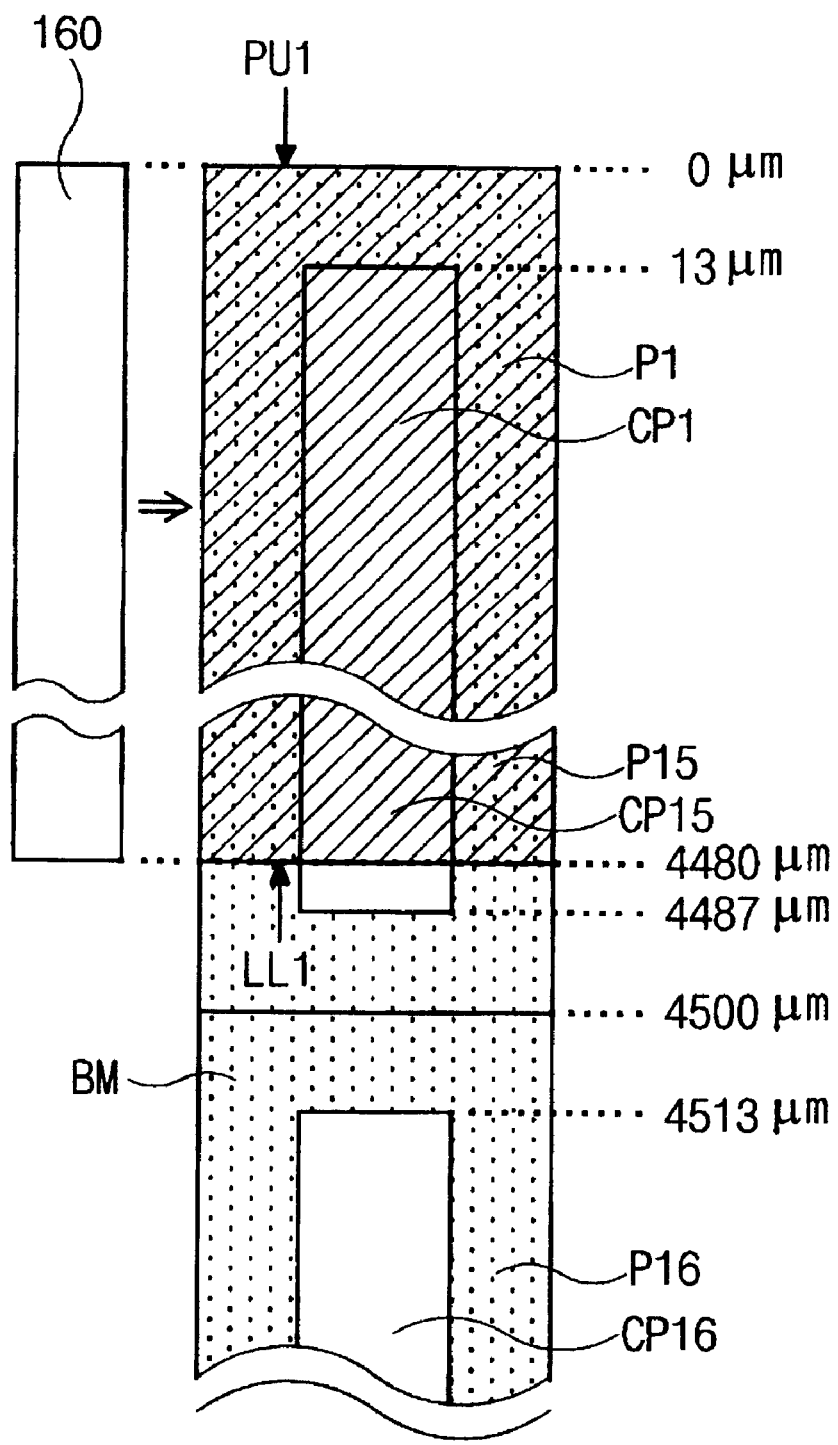
FIGS. 9A and 9B and FIGS. 10A and 10B plan are views showing a color filter substrate fabricated by a thermal imaging method according to an embodiment of the present invention.
Figure 9B:
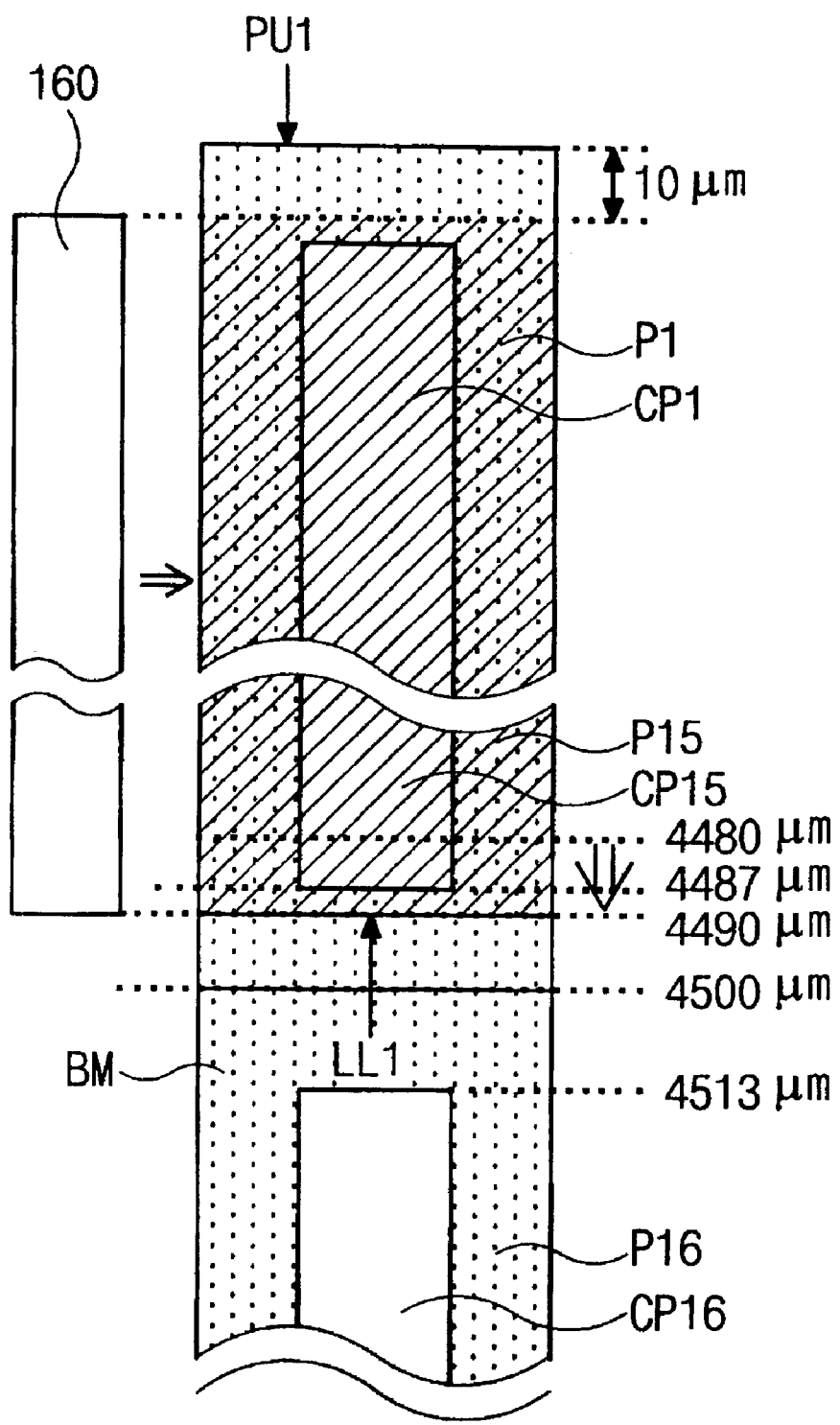
Figure 10A:
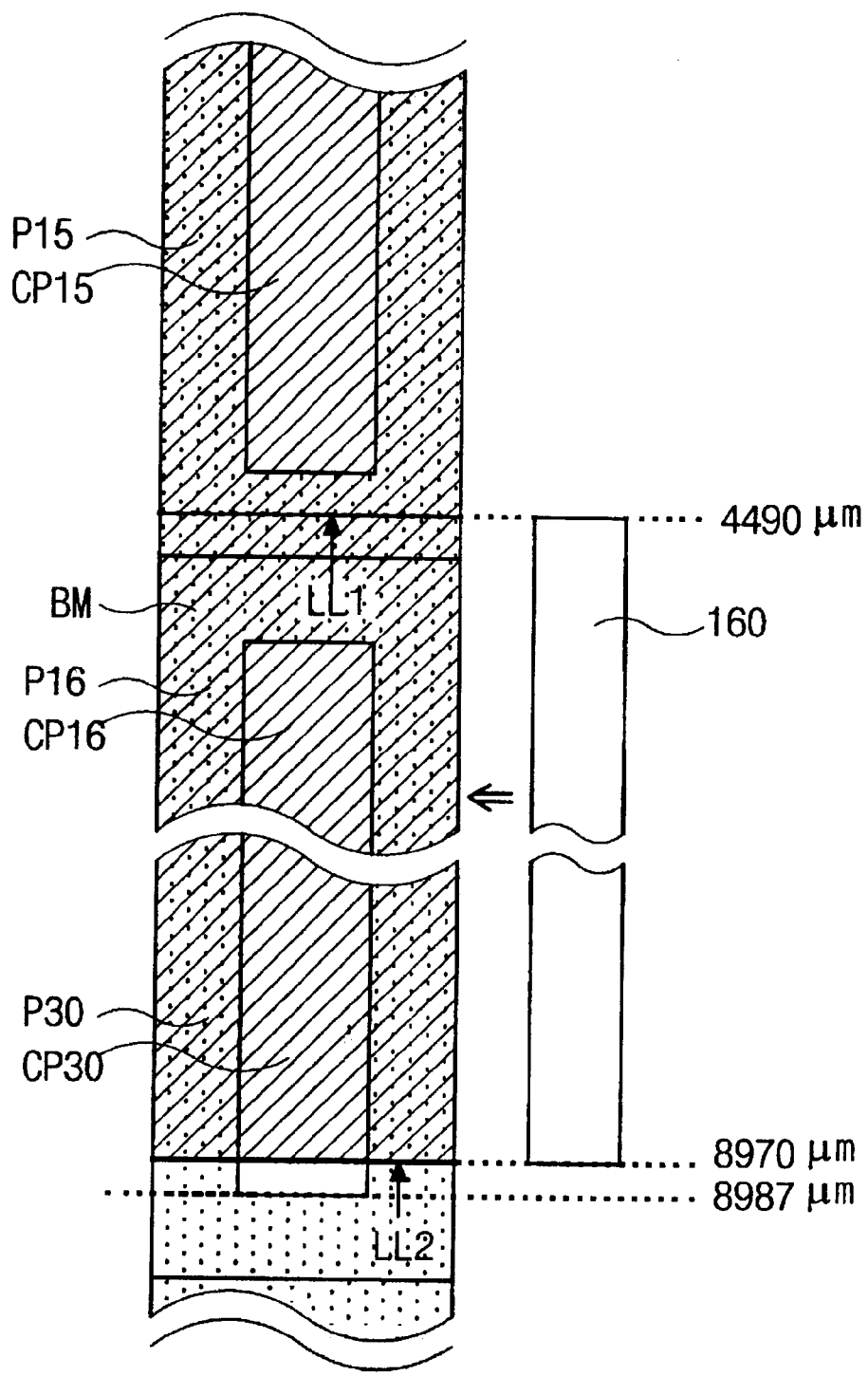
Figure 10B:
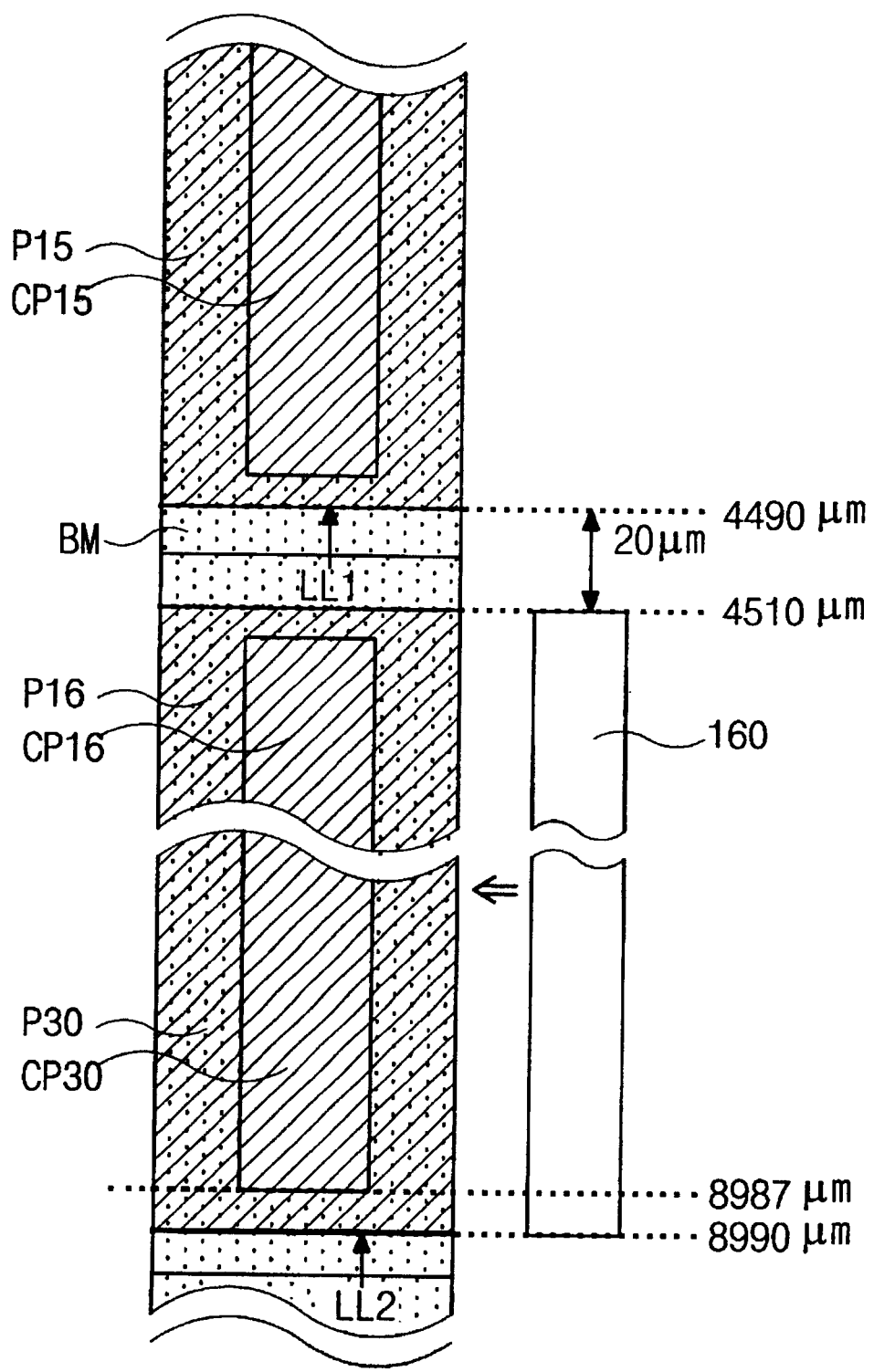

FIG. 9A shows a typical first scan in a manner similar to that of FIG. 3A. As shown in FIG. 9A, the laser head 160 horizontally scan the substrate with a width of about 4480 μm. In a first scanning, pixels from a first line to fifteenth line would be scanned, and a lower line LL1 of a first scanning region would be undesirably placed on a color filter pattern CP15 in the fifteenth line (fifteenth color filter pattern CP15). More particularly, the lower line LL1 of the first scanning region would be about 7 μm from the bottom of the fifteenth color filter pattern CP15. The lower line LL1 of the first scanning region, which would also be a border line between the first scanning region and a second scanning region, would cause a horizontal line during driving of the related art LCD device. In contrast, in this exemplary embodiment of the present invention, the laser head moves by various distances in order to locate the border line LL1 between the first and second scanning regions on the black matrix BM. That is, the laser head 160 does not move by regular widths, and therefore, the scanning regions may overlap or may be spaced apart (i.e., defining a gap) from each other.

Instead as shown in FIG. 9B, an upper line of the first scanning region is about 10 μm from the top PU1 of the first pixel P1. Since the scan width is about 4480 μm, the lower line LL1 of the first scanning region is situated on the place being 4490 μm from the top PU1 of the first pixel P1 (that is, on the black matrix BM). The lower line LL1 of the first scanning region is 3 μm from the bottom of the fifteenth color filter pattern CP15.

Next, as shown in FIG. 10A, the laser head 160 would move by about 4480 μm from the lower line LL1 of the first scanning region to a position of 4490 μm, and a second scanning would be performed. Thus, the lower line LL2 of the second scanning region would be located on a place being about 8970 μm from the top PU1 of the first pixel P1 of FIG. 9B, and would also be situated on a color filter pattern CP30 in the thirtieth line (thirtieth color filter pattern CP30). That is, the lower line LL2 of the second scanning region would be about 17 μm from the bottom of the thirtieth color filter pattern CP30. As a result, another horizontal line would be formed due to the lower line LL2 of the second scanning region.

Therefore, as shown in FIG. 10B, the second scanning region starts according to the first exemplary embodiment at the point being about 20 μm from the lower line LL1 of the first scanning region. Then, the lower line LL2 of the second scanning region is about 8990 μm from the top PU1 of the first pixel P1, and is located on the black matrix BM. As stated above, if nth scanning is accomplished by controlling a shift width of the laser head after (n−1)th scanning, the border between the scanning regions is located on the black matrix BM. Accordingly, degradation of image quality is prevented.

The shift width of the laser head is the scanning width ± the black matrix width C2, 4480 μm±26 μm, for example. Since the scan width depends on the number of the laser pixels and on the size of the laser pixel, the border lines between the scanning regions can be placed on the black matrix, which has a width within a range of 5 μm to 40 μm, by controlling the overlapping width or spacing distance between the scanning regions.

Figure 8D:
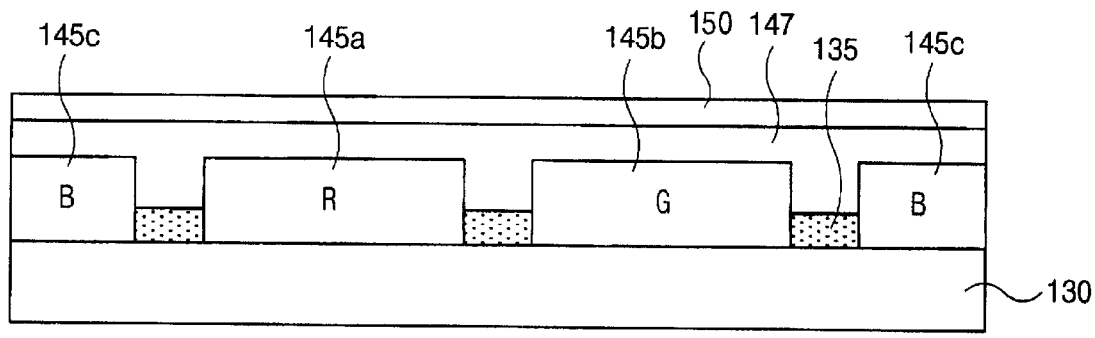

Next, as shown in FIG. 8D, a second color filter pattern 145b and a third color filter pattern 145c are formed on the substrate 130 by using second and third color transcription films with the same method above. The color filter patterns 145a, 145b and 145c are hardened in a hardening furnace under temperatures of about 200–300 degrees centigrade. An overcoat layer 147 and a common electrode 150 are subsequently formed on the color filter patterns 145a, 145b and 145c. The overcoat layer 147 protects the color filter patterns 145a, 145b and 145c and flattens the surface of the substrate 130 otherwise having steps. The common electrode 150 is made of a transparent conductive material, such as indium-tin-oxide and/or indium-zinc-oxide.

Figure 11:
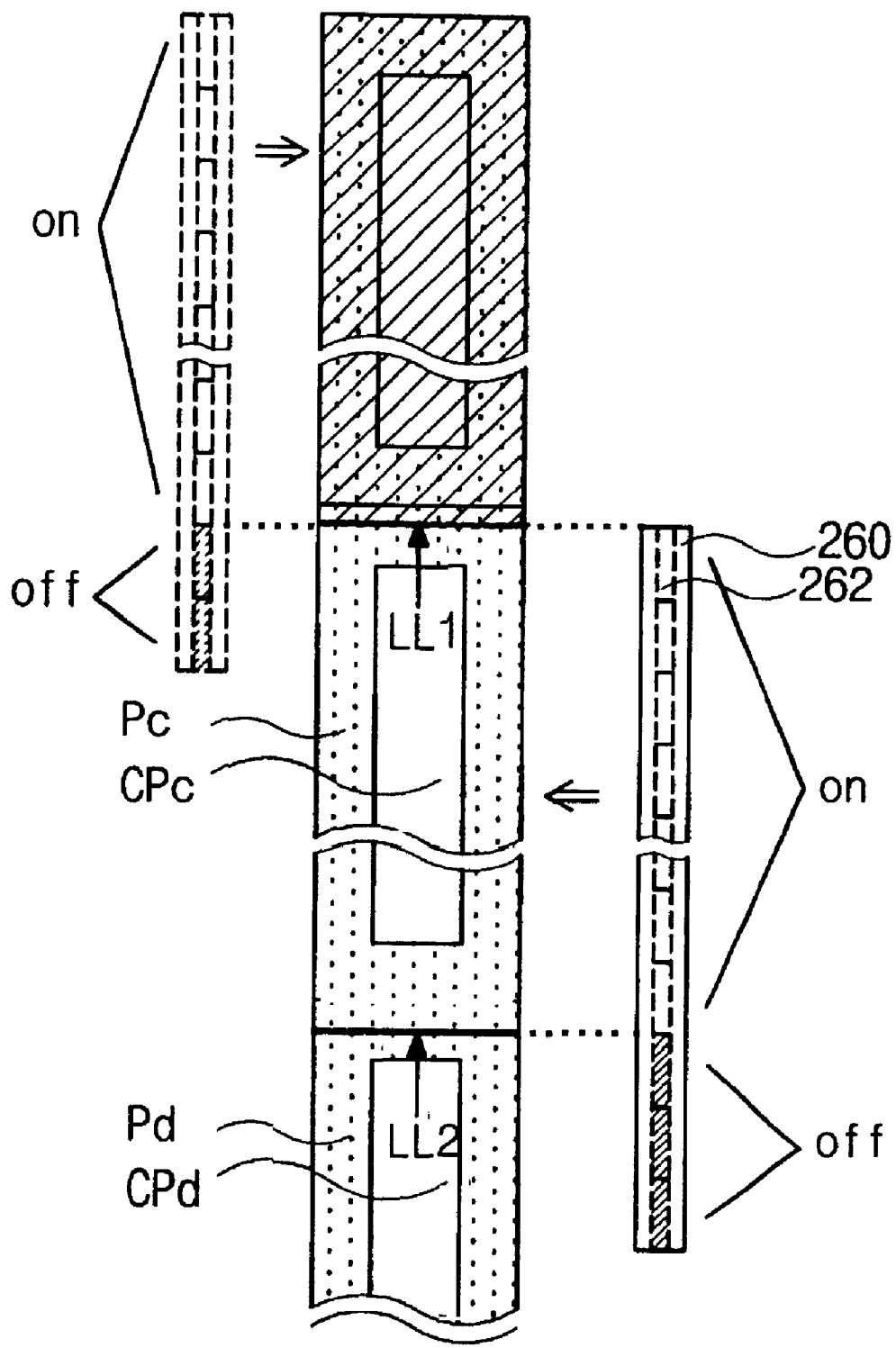
FIG. 11 is a plan view showing a color filter substrate fabricated by a thermal imaging method according to another embodiment of the present invention.

FIG. 11 shows a color filter substrate fabricated by a thermal imaging method according to another exemplary embodiment of the present invention. In this second exemplary embodiment of the present invention, a border between the scanning regions is located on a black matrix by controlling some laser pixels of a laser head to be in an inactive state.

As shown in FIG. 11, the laser head 260 including a plurality of laser pixels 262 is disposed over the first color transcription film (not shown). Then, for example, a first laser scanning is performed horizontally with respect to FIG. 11. When a lower line LL1 of a first scanning region is located on a color filter pattern CPc, laser pixels 262 overlapping the color filter pattern CPc turn off, and the laser head 260 scans the substrate with off laser pixels 262.

Next, the laser head 260 moves in a vertical direction, and at this time, a first end of the laser head 260 should correspond to the lower line LL1 of the first scanning region. If a lower line of a second scanning region is located on a color filter pattern CPd, laser pixels 262 overlapping the color filter pattern CPd turn off as well, and the second scanning is accomplished. The off laser pixels have a shorter length than the pixel region of the color filter substrate. That is, the effective length of the laser head is rounded down to the next integral number of pixel regions to keep the boundary lines of the scan regions on the black matrix. In this second exemplary embodiment, because the borders between scanning regions are located on the black matrix BM, degradation of image quality is prevented.

In yet another exemplary embodiment of the present invention, the thermal imaging methods of the first and second exemplary embodiments can be mixed.

In the second exemplary embodiment, when the lower line of the scanning region is located on a lower part of the color filter pattern in the context of the Figure, laser pixels overlapping the color filter pattern turn off. That is, when the lower line of the scanning region is situated on a place being about 270 μm from the top of a pixel, which has a size of about 100 μm by 300 μm, 13 laser pixels from the bottom, $212^{th}$ to $224^{th}$ laser pixels, turn off. This scanning is inefficient. Therefore, the laser scanning is carried out by controlling an upper line of a scanning region within the vertical width of the black matrix, about 20 μm. Then, the scanning region may cover the color filter pattern, and scanning efficiency is improved.

It should be recognized that the present invention can be embodied in a number of alternative configurations and variations. For example, the present invention has been explained with the laser head being moved. However, the color filter substrate may be moved or a combination of the color filter substrate and the laser head may be moved. The invention has been described with the orientation of the laser head along the direction of the pixel regions to generally achieve improved efficiency. However, other orientations may be used to achieve scanning of the color filter substrate. It should also be recognized that the present invention can be utilized with other types of liquid crystal display devices, including in-plane switching mode (IPS) devices.

It will be apparent to those skilled in the art that various modifications and variations can be made in the color filter substrate and method of fabricating a color filter substrate of the present invention without departing from the spirit or scope of the invention. Thus, it is intended that the present invention cover the modifications and variations of this invention provided that they come within the scope of the appended claims and their equivalents.

What is claimed is:

1. A method of fabricating a color filter substrate for a liquid crystal display device, comprising steps of:

forming a black matrix on a substrate;

adhering a color transcription film to the substrate;

disposing a laser head over the color transcription film;

repeatedly scanning the color transcription film so that end lines defined by each one of the repeated scans are located on the black matrix; and removing the color transcription film so that a color filter pattern remains in color filter pattern regions defined inside the black matrix.

2. The method according to claim 1, wherein the laser head includes a plurality of laser pixels.

3. The method according to claim 2, wherein a dimension between end lines defined by of each one of the repeated scans is determined by a product of a length of each laser pixel times the number of laser pixels.

4. The method according to claim 3, wherein each laser pixel has a length in a direction perpendicular to a scan direction within a range of about 5 μm to about 20 μm.

5. The method according to claim 4, wherein each laser pixel has a width in a direction parallel to the scan direction of about 3 μm.

6. The method according to claim 4, wherein the dimension between the end lines defined by each one of the repeated scans is between N×B+(N−1)×C and N×(B+C), where N is an integer, C is a width of the black matrix in the direction perpendicular to the scan direction, and B is a length of a color filter pattern region defined inside the black matrix in the direction perpendicular to the scan direction.

7. The method according to claim 4, wherein the dimension between the end lines defined by each one of the repeated scans is between N×B+(N−1)×C and N×B+(N−0.5)×C, where N is an integer, C is a width of the black matrix in the direction perpendicular to the scan direction, and B is a length of a color filter pattern region defined inside the black matrix in the direction perpendicular to the scan direction.

8. The method according to claim 2, wherein some of the laser pixels are active during the repeated scans and other ones of the laser pixels are inactive during the repeated scans, a dimension between end lines defined by of each one of the repeated scans is determined by a product of a length of each laser pixel times the number of active laser pixels.

9. The method according to claim 8, wherein the inactive laser pixels are all disposed toward one end of the laser head.

10. The method according to claim 8, wherein the inactive laser pixels are disposed in at least one predetermined portion of the laser head.

11. The method according to claim 8, wherein the dimension between the end lines defined by each one of the repeated scans is between N×B+(N−1)×C and N×(B+C), where N is an integer, C is a width of the black matrix in a direction perpendicular to a scan direction, and B is a length of a color filter pattern region defined inside the black matrix in a direction perpendicular to the scan direction.

12. The method according to claim 1, wherein a border between a nth (n is natural number) scan and a (n−1)th scan corresponds to a region on the black matrix.

13. The method according to claim 12, wherein the nth scan overlaps with the (n−1)th scan, a dimension of the overlap amount being smaller than a width of the black matrix.

14. The method according to claim 12, wherein a gap is defined between the nth scan and the (n−1)th scan, a dimension of the gap being smaller than a width of the black matrix.

15. The method according to claim 1, further comprising a step of hardening the color filter pattern.

16. The method according to claim 1, further comprising steps of:

forming a common electrode on the color filter pattern; and forming an overcoat layer between the color filter pattern and the common electrode.

17. A method of fabricating a color filter substrate for a liquid crystal display device, comprising steps of:

forming a black matrix on a substrate, the black matrix defining a plurality of openings as color filter pattern regions;

adhering a color transcription film to the substrate having the black matrix formed thereon;

disposing a laser head over the color transcription film, the laser head including a plurality of laser pixels;

repeatedly scanning the color transcription film by controlling ON/OFF states of the laser pixels to define an exposure pattern, wherein end lines of each one of the repeated scans is located on the black matrix; and removing the color transcription film so that a color filter pattern remains in desired ones of the color filter pattern regions.

18. The method according to claim 17, wherein some of the laser pixels are active during the repeated scans and other ones of the laser pixels are inactive during the repeated scans.

19. The method according to claim 18, wherein a dimension between end lines defined by of each one of the repeated scans depends on the number of active laser pixels.

20. The method according to claim 18, wherein the inactive laser pixels are all disposed toward one end of the laser head and a distal one of the inactive laser pixels is disposed over the color filter pattern region during the repeated scans.

21. The method according to claim 17, wherein the pixel length of pixel region on the color filter substrate is within a range of about 200 μm to about 350 μm.

22. The method according to claim 17, wherein a dimension between end lines defined by of each one of the repeated scans is determined by a length of each laser pixel times the number of laser pixels.

23. The method according to claim 17, further comprising a step of hardening the color filter pattern.

24. The method according to claim 17, further comprising steps of:

forming a common electrode on the color filter pattern; and forming an overcoat layer between the color filter pattern and the common electrode.

* * * * *

UNITED STATES PATENT AND TRADEMARK OFFICE
CERTIFICATE OF CORRECTION

PATENT NO.       : 6,682,862 B1
APPLICATION NO.  : 10/419255
DATED            : January 27, 2004
INVENTOR(S)      : Chang et al.

It is certified that error appears in the above-identified patent and that said Letters Patent is hereby corrected as shown below:

Title Page,
Item [75], Inventors, should read:

-- Youn-Gyoung Chang, Gyeonggi-do (KR); Jung-Jae Lee, Gyeonggi-do (KR); Sam-Yeoul Kim, Gyeonggi-do (KR); Jonathan V. Caspar, Henry Clay Village, DE.; and Harry Richard Zwicker, Glen Mill, PA. --

Signed and Sealed this

Third Day of October, 2006

JON W. DUDAS
*Director of the United States Patent and Trademark Office*